No. 632,730. Patented Sept. 12, 1899.
N. L. LODAHL.
CURRYCOMB.
(Application filed June 28, 1899.)
(No Model.)
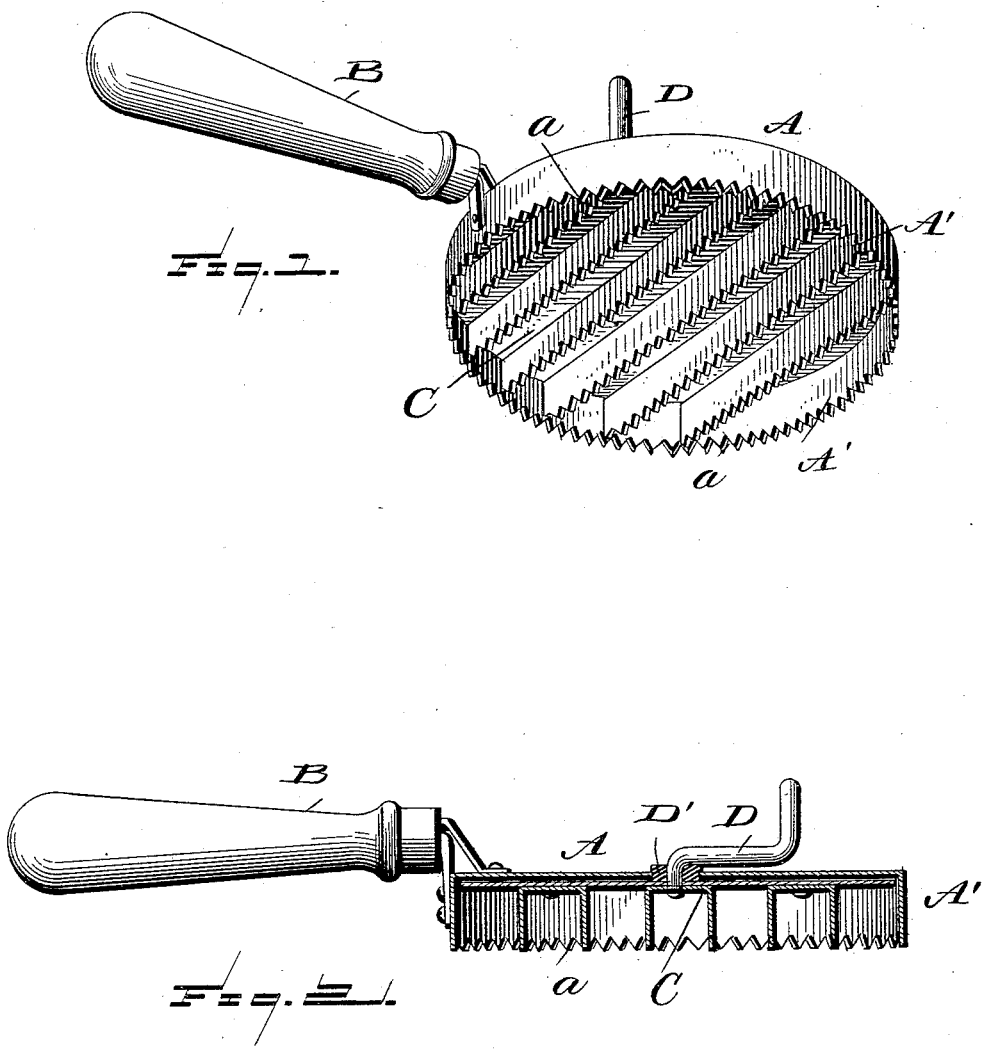
Witnesses
L. C. Hills,
A. L. Hough
Inventor
Nels L. Lodahl
By Franklin N. Hough
Attorney
THE NORRIS PETERS CO., PHOTO-LITHO., WASHINGTON, D. C.

UNITED STATES PATENT OFFICE.

NELS L. LODAHL, OF PETERSON, MINNESOTA.

CURRYCOMB.

SPECIFICATION forming part of Letters Patent No. 632,730, dated September 12, 1899.

Application filed June 28, 1899. Serial No. 722,166. (No model.)

*To all whom it may concern:*

Be it known that I, NELS L. LODAHL, a citizen of the United States, residing at Peterson, in the county of Fillmore and State of Minnesota, have invented certain new and useful Improvements in Currycombs; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in currycombs, and particularly to a currycomb having a rotary disk carrying teeth, which is mounted within a casing and having a suitable handle, whereby the comb may be rotated within the casing, which is provided with a suitable handle and adapted to be held stationary.

More specifically, the present invention resides in the provision of a currycomb having a rotary disk which is provided with teeth upon one face and mounted so as to rotate within a circular casing, the periphery of which has teeth which are substantially in the same plane as the teeth of the rotary disk, said disk having secured thereto a turning-crank, the shank of which is journaled in the casing, and the casing provided with a handle whereby the casing may be held stationary while the disk carrying the teeth is being rotated.

To these ends and to such others as the invention may pertain the same consists, further, in the novel construction, combination, and adaptation of parts, as will be hereinafter more fully described and then specifically defined in the appended claims.

My invention is clearly illustrated in the accompanying drawings, which, with the letters of reference marked thereon, form part of this application, and in which drawings—

Figure 1 is a perspective view of my improved rotary-disk currycomb, and Fig. 2 is a sectional view through the currycomb.

Reference now being had to the details of the drawings by letter, A designates the casing of the currycomb, which is preferably circular in outline and is provided with a handle B, secured rigidly thereto. The said casing has a rim A', the free edge of which is serrated, as at a. The rotary part of the currycomb consists of the disk C, which is of such a shape as to fit within and cover the entire surface of said casing, and at its center is secured the inner end of the crank-handle D. The shank portion of this crank is journaled in a central aperture in the casing, a suitable washer D' being mounted on the crank outside of the casing. Said disk has the usual currycomb-teeth, which are arranged upon its surface, as shown, and extend outward, the free ends of the teeth being preferably in a plane coincident with the plane in which the points on the rim of the casing are disposed.

The operation of my currycomb will be readily understood, as the operator may hold it in one hand upon a certain part of the animal to be combed, and the casing may be held tightly in one place while the crank-handle is being operated to thoroughly comb the parts confined underneath the casing, or, if preferred, the currycomb may be operated in the usual manner, whereby the rotary disk is allowed to turn back and forth upon its pivot.

I am aware that it is common in the art to construct currycombs in which the entire comb and casing therefor are adapted to rotate as the currycomb is used, and I make no claim for such construction, as the essential feature resides in the provision of a stationary casing having a rotary-disk comb mounted to operate therein, with a suitable operating-handle whereby said disk may be rotated.

Having thus described my invention, what I claim to be new, and desire to secure by Letters Patent, is—

1. A currycomb consisting of a stationary casing and handle mounted thereon, combined with a rotary comb-disk working within said casing, and means for rotating the disk independent of the casing, as set forth.

2. A currycomb consisting of a casing having a rim with serrated edge and handle secured to said casing, a circular disk having comb-teeth mounted in said casing, a crank-handle fastened to said disk, and journaled in an aperture in the casing, as shown and described.

In testimony whereof I affix my signature in presence of two witnesses.

NELS L. LODAHL.

Witnesses:
H. B. NEWELL,
J. O. ENSBERG.